(12) United States Patent
McCoy

(10) Patent No.: US 6,851,216 B2
(45) Date of Patent: Feb. 8, 2005

(54) UNIVERSAL GUIDE

(75) Inventor: Michael M. McCoy, Newberg, OR (US)

(73) Assignee: Snake Brand Guides, Battle Ground, WA (US)

( * ) Notice: Subject to any disclaimer, the term of this patent is extended or adjusted under 35 U.S.C. 154(b) by 1 day.

(21) Appl. No.: 10/409,900

(22) Filed: Apr. 9, 2003

(65) Prior Publication Data

US 2004/0200124 A1 Oct. 14, 2004

(51) Int. Cl.[7] .............................................. A01K 87/04
(52) U.S. Cl. ........................................................ 43/24
(58) Field of Search .............................. 43/24; D22/143

(56) References Cited

U.S. PATENT DOCUMENTS

| 358,420 | A | * | 2/1887 | Wright | 43/24 |
| 2,398,862 | A | * | 4/1946 | Sarkisian | 43/24 |
| 2,623,317 | A | * | 12/1952 | De Maria | 43/24 |
| 2,762,154 | A | * | 9/1956 | Marke | 43/24 |
| 2,778,141 | A | * | 1/1957 | Haas | 43/24 |
| 2,992,506 | A | * | 7/1961 | Garbolino | 43/24 |
| D256,714 | S | * | 9/1980 | Ohmura | D22/143 |
| D335,328 | S | * | 5/1993 | Ohmura | D22/143 |

FOREIGN PATENT DOCUMENTS

| GB | 2012151 | * | 7/1979 | 43/24 |

* cited by examiner

Primary Examiner—Kurt Rowan
(74) Attorney, Agent, or Firm—Laura N. Tunnell

(57) ABSTRACT

A universal guide is a base of a fishing line guide assembly designed to conform to the outside radius of a round rod or to the flat surface of a rod having a polygonal cross section. The guide is preferably helical. The base has a curved top side, a segmented underside, and tips at the toes of the guide. The underside has a concave portion and a flat portion. The concave portion comprises the center of the segmented underside and extends the length thereof. The surface of the concave portion is designed to conform to the outside diameter of a round rod. The flat portion flanks both sides of the central concave portion and also extends the length of the guide foot. The surfaces of the flat portion are designed to match the outside surface of a standard fishing rod having a polygonal cross section. The guide foot tips taper the thickness of the base from the top surface to the underside enabling a smooth transition for wrapping at the guide-rod interface.

4 Claims, 8 Drawing Sheets

UNIVERSAL GUIDE

BACKGROUND OF THE INVENTION

1. Field of the Invention

This invention relates generally to fishing line guides and more specifically to a universal guide foot capable of conforming to round or polygonal fishing rods.

2. Prior Art

As with any mechanical device, the performance of a fishing rod is directly impacted by the cooperation of its elements. Loose or badly fitting line guides contribute to friction between the line and the guide, resulting in impeded action and snarled lines. Because line guides are usually hand-wrapped to the rod, the quality of the guide itself dictates the effort and attention necessary for attachment. Furthermore, a poorly fitting guide requires use of significant amounts of epoxy to be used in the attachment process, not only adding extraneous weight to the rod, but also upsetting an otherwise smooth mass distribution along the rod axis. All of these factors are a significant impediment to optimal performance.

Many of these difficulties are a consequence of both guide design and poor quality control during the manufacturing process. For example, prior art guide feet are stamped flat. This is not a problem for hexagonal rods. However, for round rods, an unnecessary pivot line along the foot-rod interface is introduced, resulting in an undesirable instability along the lateral dimension of attachment area. In addition, the top outside edges of a flat guide foot are sharp and will damage threads used in the wrapping process, leading to fraying and eventual breakage.

The lateral profile of a prior art guide foot exhibits steep angles from the toe of the foot to the interface with the line guide wire, leaving gaps between the rod surface and the underside of the foot. This necessitates an extensive use of epoxy, adding more overall weight as well as introducing discontinuities in the weight distribution of the rod. The resultant effect is a dampening of motion in even the best-designed rods.

Guide feet misalignment is a problem in the upper section of a rod due to the limited space available for wrapping.

The toe of a prior art guide foot is generally tapered on a grinding wheel. This practice leads not only to inconsistency between different guides of the same size, but also to different feet of the same guide. Furthermore, grinding also introduces sharp 10 points at the tip of the foot. When the rod is flexed during casting, the rod shank bends smoothly along its length while the guide feet remain rigid. The wrapping fibers covering the toe of the guide foot are thus confined by a slight arch on the underside of the rod yet must remain rigidly linear on the topside of the guide foot. This uneven stress results in fraying and breakage of the wrapping fibers and eventually compromises the integrity of the rod blank.

Consequently, a line guide capable of conforming to the shape of either a round or polygonal fishing rod is desirable. A line guide having a smooth profile from any point on the guide to any point on the rod-guide interface is furthermore desirable. In addition, there is a long felt need for a precision manufactured guide to alleviate many of the difficulties, limitations and detriments associated with wrapping.

OBJECTS AND ADVANTAGES

An objective of this invention is to provide a universal guide foot that eliminates instability between the underside of the foot and the outer surface of any rod, regardless of whether it has a round or polygonal cross section. A further objective is to provide a guide foot that can be consistently manufactured with a very high degree of precision. A still further objective is to provide a guide foot characterized by a smooth profile along its top surface as well as at the sides and toes of the guide-rod interface to facilitate the wrapping process and to prevent damage to the wrapped threads.

The present design enables the guide foot to be stamped in dies, thus allowing a degree of precision to be achieved that is unique to the industry. This greatly alleviates problems associated with wrapping, thereby increasing efficiency of production, decreasing cost, and providing a guide foot that interferes to a minimal degree with the action of the fishing rod.

The elimination of instability between the rod surface and the underside of the guide foot is realized by a foot having partitioned sections capable of conforming to either round or flat surfaces. More specifically, the guide foot has two sections that extend along its length. A middle section comprises a curved surface designed to mate with the outer curved surface of a round rod. Two outer sections flank the middle partition and are flat, enabling them to mate with an outer flat face of a polygonal rod.

A smooth profile over the outer surface of the guide foot is accomplished through several design features.

The top surface of the foot is curved with a center of curvature concentric with that of the inner middle section but having a slightly larger radius. This avoids sharp outer edges as are found in flat guide feet and eliminates damage to wrapped threads caused by resultant sharp outer corners.

Die stamping enables precision foot alignment. In addition to simplifying the wrapping process and circumventing post-wrap adjustments, well aligned feet act in concert to efficient use of rod length, particularly in the upper sections of the rod where space is very limited.

Die stamping also enables precision toe tapering. This avoids burring as is a commonplace occurrence using the standard practice of grinding and insures consistency between feet of the same size. Both factors preclude the necessity for attachment aided by heavy quantities of epoxy, thereby more effectively preserving the mass distribution and action of a pristine rod. Consequently, stress on the rod blank is reduced, thereby prolonging its life and its performance.

These and additional objects, advantages, features, and benefits of the present invention will become apparent from the following specification.

BRIEF DESCRIPTION OF THE DRAWINGS

FIG. 1.B an end-on view of the fishing line guide in accordance with the present invention.

FIG. 1.C is a side view of the fishing line guide in accordance with the present invention.

FIG. 1.D is a perspective view of the fishing line guide in accordance with the present invention.

FIG. 4.B is a bottom view again showing detail as seen from the bottom.

FIG. 4.C shows a cross section of the guide base along the length cut denoted "B" in FIG. 4.A.

FIG. 4.D shows a cross section of the guide base along the cross cut denoted "A" in FIG. 4.A.

FIG. 5.B shows the cross section of a line guide base according to the present invention attached to the typical rod of FIG. 5.A.

FIG. 5.C shows an expanded version of FIG. 5.B in which the shaped undersurface of the line guide base is shown to complement the outer circumference of the round rod.

FIG. 6.B shows the cross section of a line guide base according to the present invention attached to the typical rod of FIG. 6.A.

FIG. 6.C shows an expanded version of FIG. 6.B in which the flat outer edges of the line guide base is shown to complement a flat face of the hexagonal rod.

FIG. 7.B is an end-on view of a prior art fishing line guide.

FIG. 7.C is an expanded view of detail "D" denoted in FIG. 7.B.

FIG. 7.D is an expanded view of detail "E" denoted in FIG. 7.E.

FIG. 7.E is a side view of a prior art fishing line guide.

FIG. 7.F is a perspective view of a prior art fishing line guide.

FIG. 8.A is a perspective view of a prior art fishing line guide emphasizing the unevenly ground toes of the base foot.

REFERENCE NUMERALS

Figure 1:
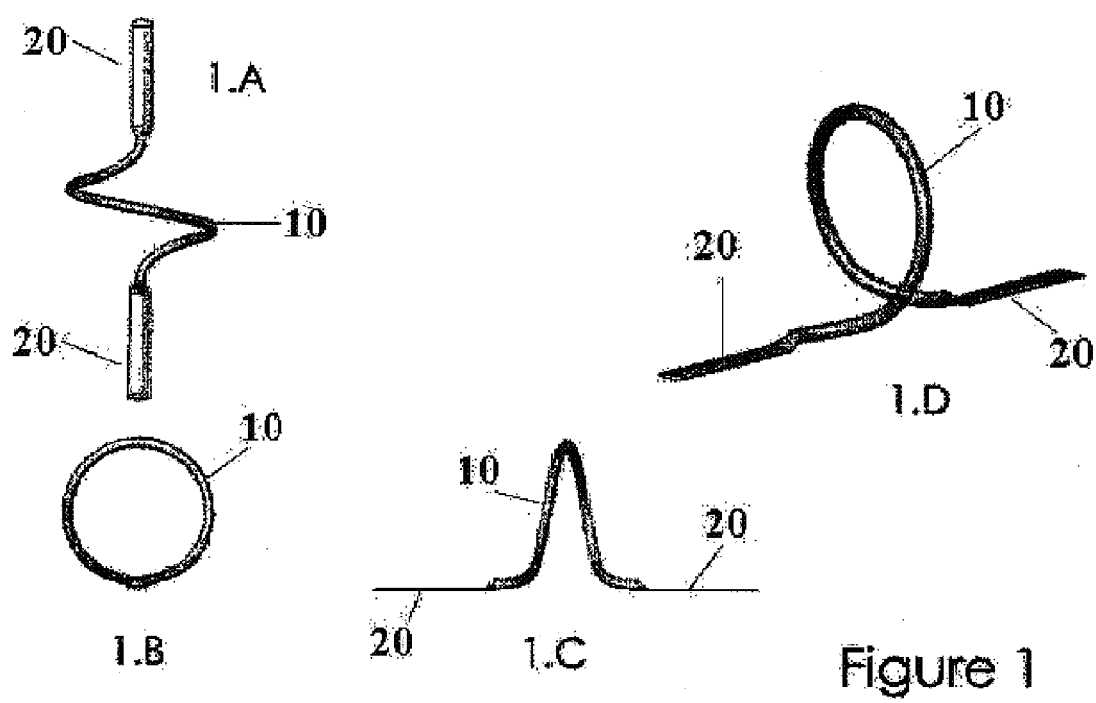
FIG. 1.A is a top view of the fishing line guide in accordance with the present invention.

(10) line guide
(20) guide foot
(50) curved upper surface of guide foot
(60) concave bottom surface of guide foot
(70) tapered toe of guide foot
(100) mounting surface
(110) detail showing concave section of undersurface
(120) detail showing flat sections of undersurface
(130) detail showing undersurface of taper ed toe
(160) reference line for crosswise cut A—A detailed in 4.D.
(170) reference line for lengthwise cut B—B detailed in 4.C.
(210) concave section of guide foot undersurface as seen in lengthwise cut B—B.
(220) curved upper surface of guide foot as seen in lengthwise cut B—B.
(230) tapered toe of guide foot as seen in lengthwise cut B—B.
(240) concave section of guide foot undersurface as seen in crosswise cut A—A.
(250) flat sections of guide foot undersurface as seen in crosswise cut A—A.
(260) curved upper surface of guide foot as seen in crosswise cut A—A.
(270) typical round fly fishing rod
(290) cross section of round rod
(300) section C expanded in FIG. 5.C.
(330) typical polygonal fly fishing rod
(350) cross section of polygon al rod
(360) section D expanded in FIG. 6.C.
(410) prior art guide foot
(420) attachment area D expanded in FIG. 7.C.
(430) flat undersurface of prior art guide foot
(440) guide foot toe E expanded in FIG. 7.D.
(450) untapered toe of prior art guide foot
(480) top view of prior art guide foot
(490) flat cross section of prior art guide foot
(500) unevenly ground toe of prior art guide foot

DESCRIPTION OF THE PREFERRED EMBODIMENTS

With reference to the drawings, FIG. 1 shows four views of the preferred embodiment of the present invention. Each view displays a fly-fishing line guide having a helical center portion (10) terminating at both ends with a guide foot (20) in accordance with the present invention.

Figure 2:
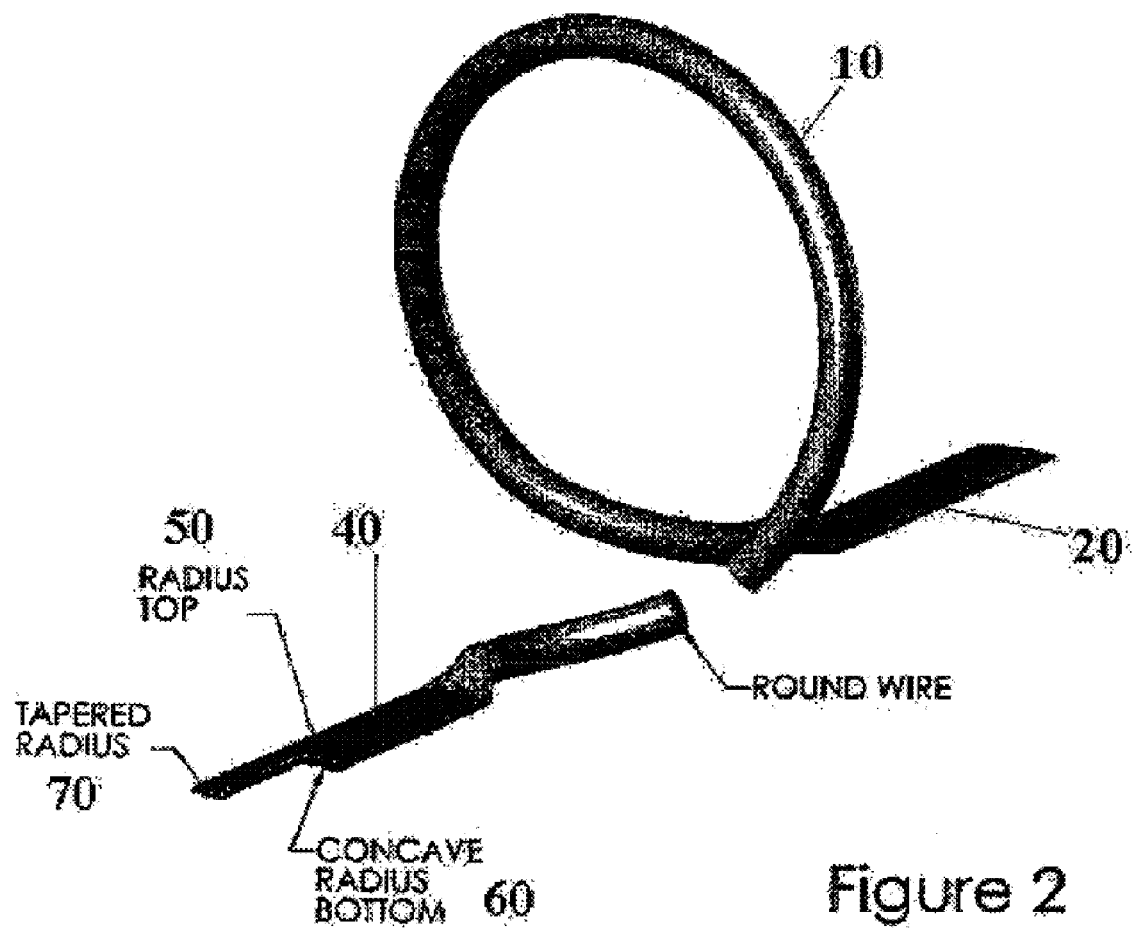
FIG. 2 is a perspective view of the line guide assembly emphasizing details as seen from above.
Figure 3:
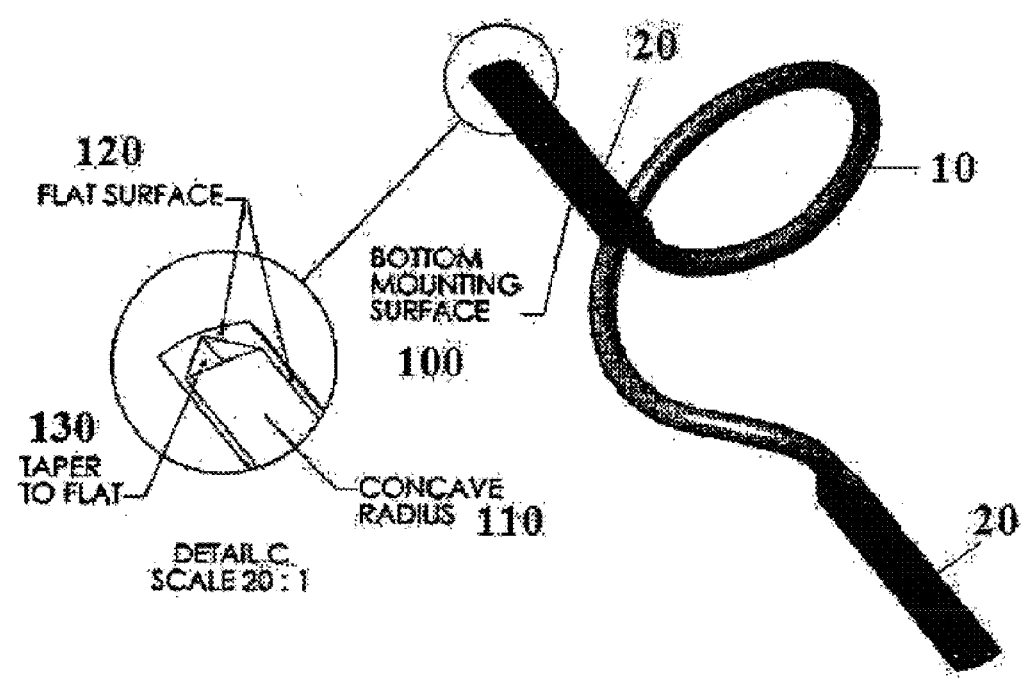
FIG. 3 is a perspective view of the line guide assembly emphasizing details as seen from below.

More detail is illustrated in FIGS. 2 and 3. FIG. 2 shows a cutaway view of the guide foot as seen from above. The bottom of the foot is concave (60); the top surface (50) has the same center of curvature as the bottom but with a slightly larger radius. The foot thickness at the toe (70) is tapered smoothly from the top to the bottom surface. FIG. 3 shows the same foot as viewed from below. The concave bottom (110) is flanked by two flat edge sections (120) along its length. A bottom view of the tapered toe (130) illustrates the transition of the shaped undersurface as the toe thickness tapers to zero.

Figure 4:
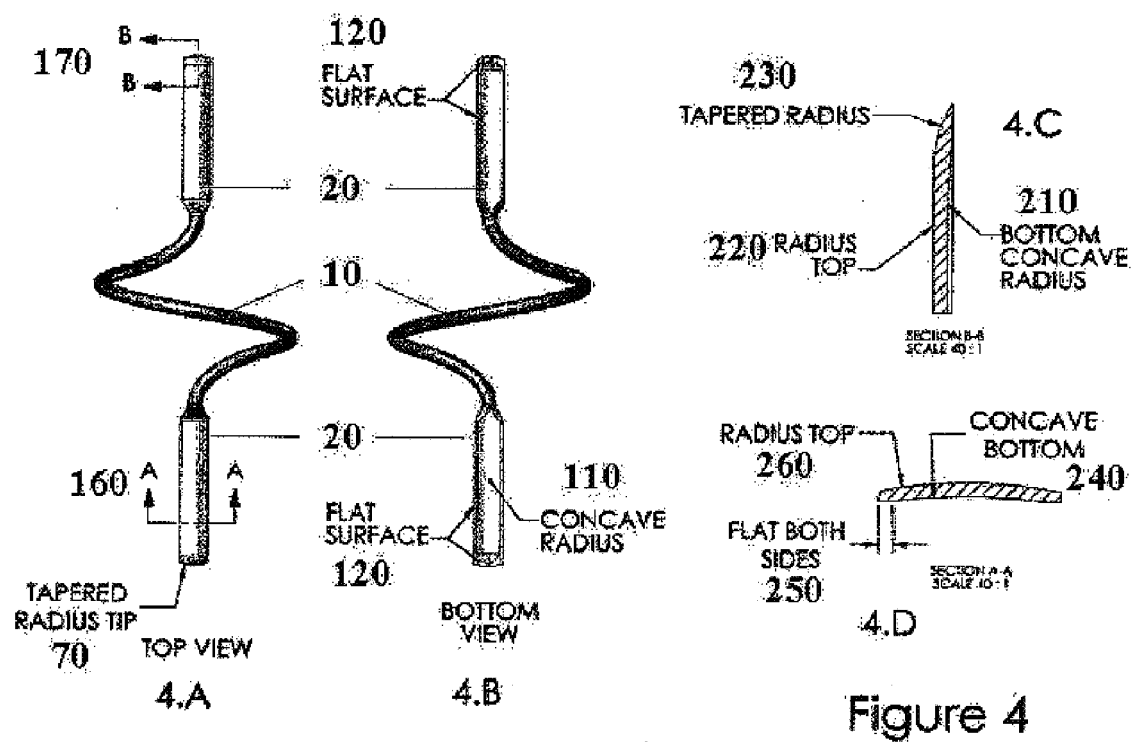
FIG. 4.A is a top view showing reference line cuts for FIGS. 4.C–D.

FIG. 4 relay the same information in a different format. The entire line guide is again shown from the top in FIG. 4.A. Two cross sectional reference lines are shown, denoted A—A (160) for a crosswise cut and B—B (170) for a lengthwise cut. The bottom of the guide foot configuration is shown in FIG. 4.B. The lengthwise extent of the concave center portion (110) and its flat outer edge flanks (120) are shown. The tapered toe can be seen at the outer extremities of the foot base (20).

Section B—B, the lengthwise cut indicated in FIG. 4.A, is illustrated in FIG. 4.C. The tapering of the toe (230) can be seen to originate from the top surface (220), smoothly decreasing the thickness of the foot along its length, and terminating at an edge where the top and bottom surfaces (210) meet.

Section A—A, the crosswise cut indicated in FIG. 4.A, is illustrated in FIG. 4.D. Here, the appropriately curved concave underside (240) can be seen with its accompanying flat sides (250). The curvature of the upper surface (260) has the same center as the bottom surface, but with a slightly larger radius.

Figure 5:
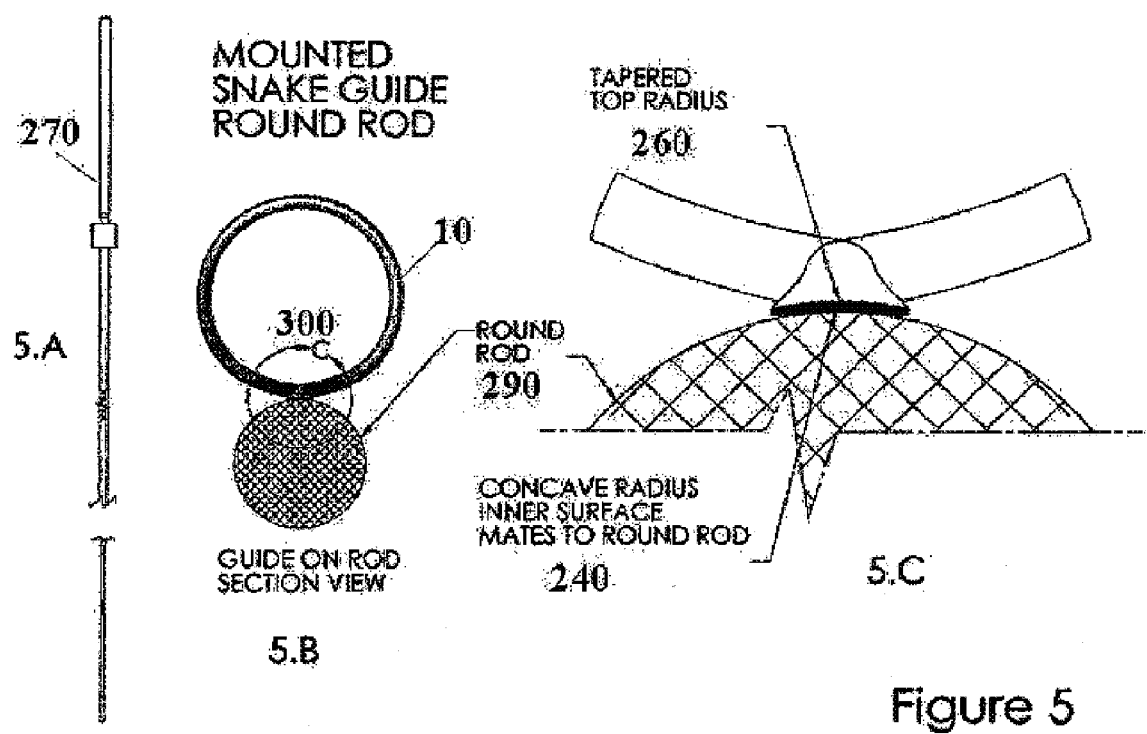
FIG. 5.A shows a typical round fly fishing rod.

FIG. 5 illustrate the details of attachment to a typical fly fishing rod (270) having a round cross section. The rod, with a cutaway portion, is shown in FIG. 5.A. FIG. 5.B shows a cross section of the round rod (290) as indicated by the hatched area. The ring shaped structure (10) is an end-on view of a helical guide. The structure enclosed by "C" (300) draws attention to the attachment area as shown in an expanded view, FIG. 5.C. Here, the outer circumference of the round rod mates with the concave central undersurface of the guide (240). Although the flat outer edge sections do not contribute to the surface-to-surface mating with the round rod, they do not compromise the stability of attachment between the guide foot and a round rod as would a completely flat foot.

Figure 6:
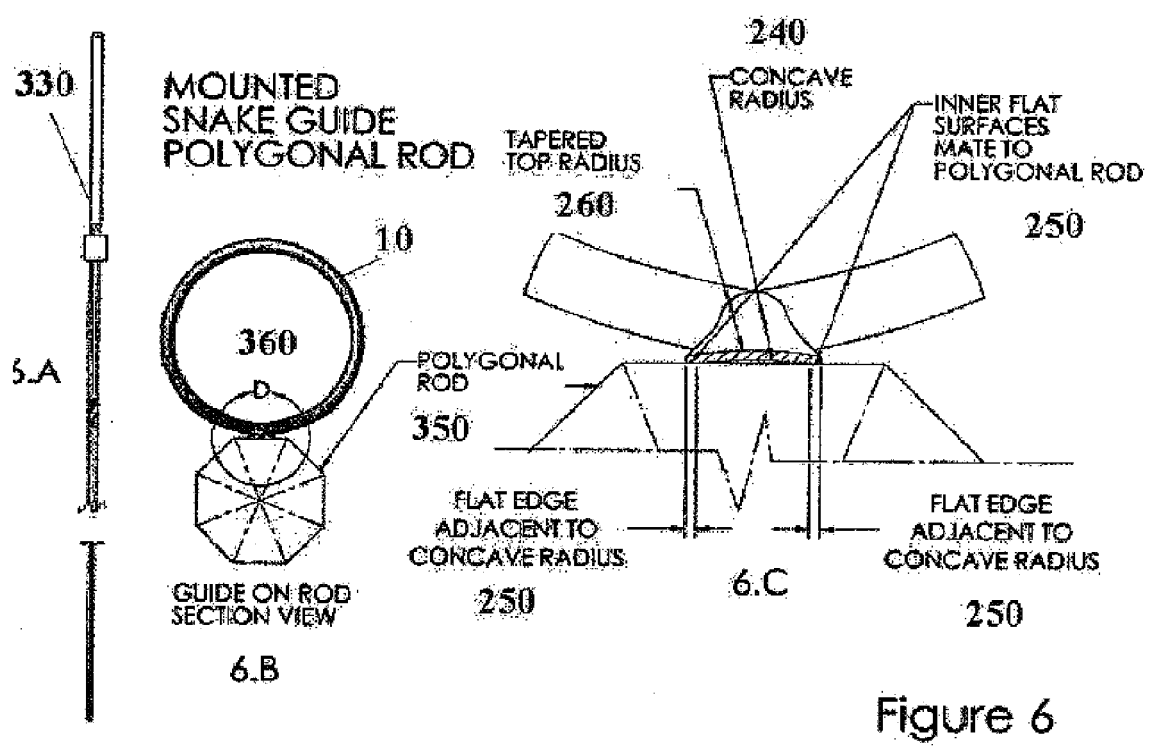
FIG. 6.A shows a typical hexagonal fly fishing rod.
Figure 7:
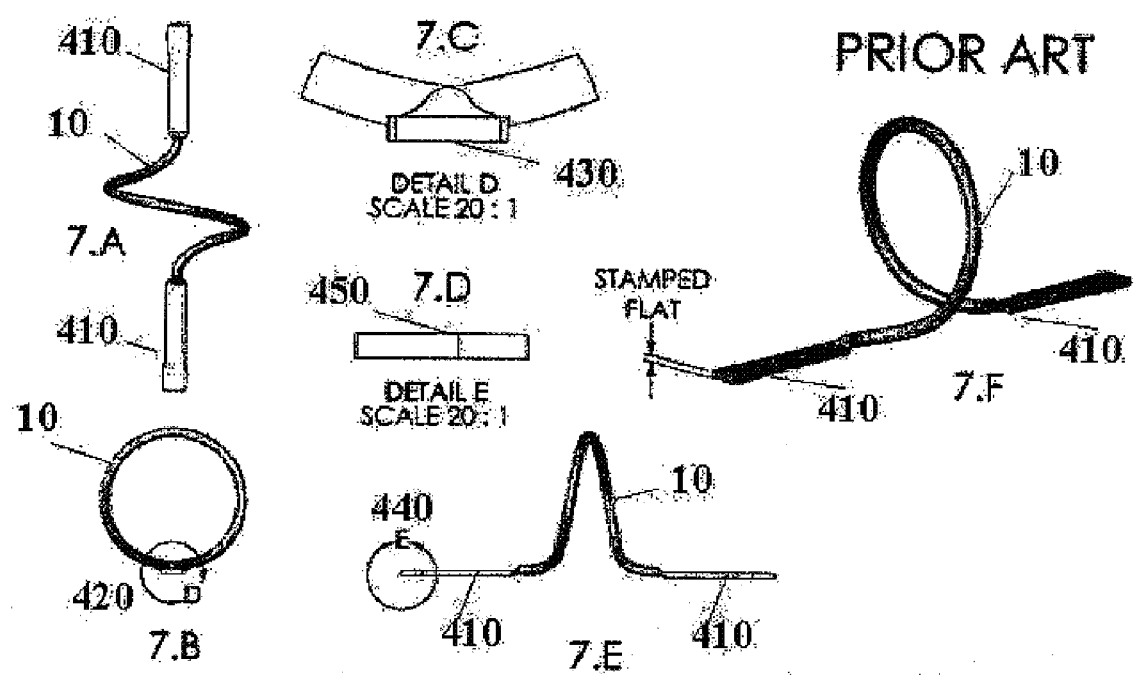
FIG. 7.A is a top view of a prior art fishing line guide.
Figure 8:
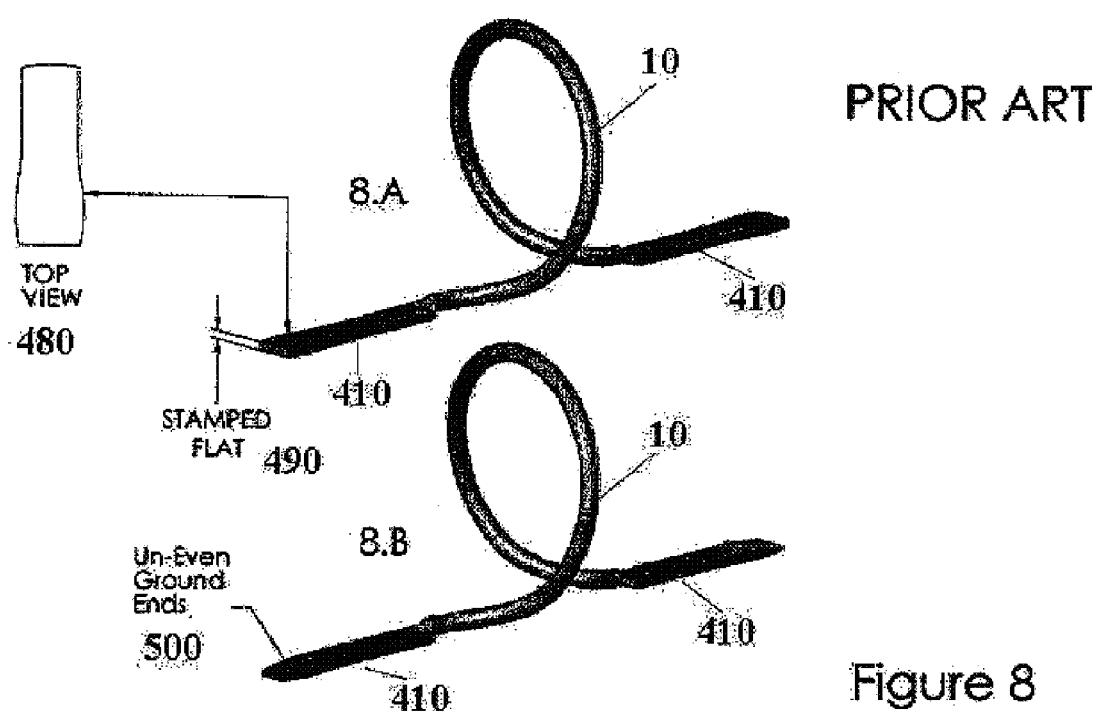
FIG. 8.A is a perspective view of a prior art fishing line guide emphasizing the flat construction of the base foot.

FIG. 6 illustrate the functionality of the guide foot structure with regards to a polygonal rod (330). Here, the converse is true. The expanded view, FIG. 6.C shows the surface-to-surface mating structure of the flat outer edges (250) with the flat outer surface of a polygonal rod (350). The curved central portion (240), is passive with respect to the mating functionality, yet it also does not impede the subsequent wrapping process and nor does it compromise the stability of attachment.

I claim:

1. A fishing rod guide base comprising:
   a foot having a segregated undersurface, said undersurface having a central concave mid-section extending the length of the foot, said central section flanked by two flat outer sections extending the length of the foot, a curved upper surface having a radius of curvature slightly larger than that of said mid-section of said undersurface, and a toe tapered smoothly from said upper surface to said undersurface.

2. The fishing rod guide base of claim 1 wherein said central concave mid-section of said undersurface mates tightly with the outer circumference of a fishing rod having a round cross section.

3. The fishing rod guide base of claim 1 wherein said flat outer sections mate tightly with the flat face of a fishing rod having a polygonal cross section.

4. A fishing line guide comprising an elongate wire having opposing ends and an open helical loop disposed between said opposing ends wherein said ends are shaped to provide a base, said base having an undersurface, said undersurface having a concave portion adapted to substantially conform to a contour on an outer surface of a fishing rod blank, said undersurface further comprising flat edges adjacent to said concave portion, and said base further comprising an arcuate upper surface in opposition to said undersurface.

* * * * *